(12) United States Patent
Ein-Gal

(10) Patent No.: US 8,244,388 B2
(45) Date of Patent: Aug. 14, 2012

(54) ARTIFICIAL CONTESTS AMONG TEMPORAL SEQUENCES

(76) Inventor: Moshe Ein-Gal, Ramat Hasharon (IL)

( * ) Notice: Subject to any disclaimer, the term of this patent is extended or adjusted under 35 U.S.C. 154(b) by 1215 days.

(21) Appl. No.: 12/032,678

(22) Filed: Feb. 17, 2008

(65) Prior Publication Data

US 2009/0018678 A1 Jan. 15, 2009

Related U.S. Application Data

(60) Provisional application No. 60/949,267, filed on Jul. 12, 2007.

(51) Int. Cl.
*G06F 19/00* (2011.01)
(52) U.S. Cl. .................. 700/91; 700/95; 463/40; 463/42
(58) Field of Classification Search .................. 700/91, 700/95; 463/42, 40
See application file for complete search history.

(56) References Cited

U.S. PATENT DOCUMENTS

| 7,040,982 B1 * | 5/2006 | Jarvis et al. ..................... 463/9 |
| 7,233,922 B2 * | 6/2007 | Asher et al. ................. 705/36 R |
| 7,566,270 B2 * | 7/2009 | Amaitis et al. ................. 463/22 |
| 2009/0054127 A1 * | 2/2009 | Sweary et al. ................. 463/16 |

* cited by examiner

*Primary Examiner* — Dmitry Suhol
*Assistant Examiner* — Brandon Gray
(74) *Attorney, Agent, or Firm* — Dekel Patent Ltd.; David Klein

(57) ABSTRACT

A method for arranging a primary contest including a primary computer system in communication with a data feed to a source of data including sequences, wherein the sequences are discrete functions of time, the method including selecting sequences as contestants in the contest, providing a definition of a contest outcome as a measure relating to either a contestant's performance independently of other contestants or a joint performance of interacting contestants, receiving data from the data feed, wherein the data relates to the sequences selected, and determining an outcome of the contest according to the definition.

8 Claims, No Drawings

ARTIFICIAL CONTESTS AMONG TEMPORAL SEQUENCES

CROSS-REFERENCE TO RELATED APPLICATIONS

This application claims priority under 35 USC §119 to U.S. Provisional Patent Application, Ser. No. 60/949,267, filed Jul. 12, 2007, which is incorporated herein by reference.

FIELD OF THE INVENTION

The present invention relates generally to games and contests, and particularly to artificial contests among temporal sequences.

BACKGROUND OF THE INVENTION

There are many types of games and contests that pit one player's skill and luck against one or more other players.

Contests can be classified into races, games and combinations thereof. Races involve individuals or teams against other competitors. Scoring is determined by an objective scale, e.g., time, distance, weight etc. In contrast, game scoring is determined by subjective events (points, goals, checkmates) scored by a given contestant against the opposing other contestants.

Similarly, contests-related gambling is also associated with races (e.g., horses, dogs, cars, track-and-field, yachting, etc.) and games (e.g., sport games, computer games). Contest-related gambling, unlike lottery-type gambling, favors a skilled player (assuming no one has fixed the contest, of course).

U.S. Pat. No. 6,024,641 to Sarno describes a method, apparatus and system for lottery gaming, wherein a simple, objective, verifiable and reliable method of selecting the winning lottery numbers is provided. A user accesses the game via a wide area network or by some other remote means and inputs required information, including payment information and the user's selections for the game. Prior to any user participating in the game, the game provider selects elements that comprise a winning combination. The elements that comprise the winning combination are objective and verifiable elements, such as, for example, a portion of the closing stock market price on a given day for a specified set of markets. As such, the elements comprising the winning combinations are objective and can be verified by all of the users. The definition of the winning combination can be redefined for each new game, or as it is generated from an indicia providing source, can remain the same for all games or a set number of games.

U.S. Pat. No. 6,929,550 to Hisada provides a second network game (for example, a betting game) using the results of a first network game (for example, a horse racing game), wherein third party users other than users running a first network game can participate. A greater number of users will thereby have interest in the first network game and the first network game will be built up. Also, a greater number of users can participate in a network game through the second network game.

U.S. Pat. No. 7,206,762 to Sireau describes a fixed-odds betting system that comprises a user terminal operable to accept parameters input by a user and relating to a fixed-odds bet on an aspect of a financial market, and a central processing machine having a data feed to a source of data concerning a financial market and means operable to calculate the fixed odds for the bet, based on at least some of the parameters input by the user and the data obtained from the data feed.

SUMMARY OF THE INVENTION

The present invention seeks to provide a method and a system for creating and operating artificial contests among temporal sequences, as is described hereinbelow.

There is thus provided in accordance with an embodiment of the present invention a method for arranging a primary contest including a primary computer system in communication with a data feed to a source of data including sequences, wherein the sequences are discrete functions of time, the method including selecting sequences as contestants in the contest, providing a definition of a contest outcome as a measure relating to either a contestant's performance independently of other contestants or a joint performance of interacting contestants, receiving data from the data feed, wherein the data relates to the sequences selected, and determining an outcome of the contest according to the definition.

In accordance with an embodiment of the present invention the sequences are normalized to be dimensionless and range-comparable to each other Further in accordance with an embodiment of the present invention the sequences are related to parameters of at least one financial market.

Still further in accordance with an embodiment of the present invention the definition includes counting a scoring event for each contestant, and wherein the scoring event is further defined by an event-formula applied jointly to the contestants. The event-formula may be a function of a sequence of alternating moves made by the contestants. Counting the scoring event may be patterned after counting a scoring event in a sport game.

In accordance with an embodiment of the present invention the method further includes playing a secondary game using predicted outcomes of at least one primary contest as played above, the secondary game including using a secondary computer system in communication with players' terminals via a network and with the primary computer system, communicating players' respective predicted outcomes for the at least one primary contest, and nominating game winners. The communicating may further include payment of a fee, and the nominating may further include awarding prizes. The network may include a local area network (LAN), a wide area network (WAN), campus-wide network, fixed based unit network, Intranet and/or Internet or any combination thereof. The primary computer system and the secondary computer system may be the same computer system.

There is also provided in accordance with an embodiment of the present invention a method for operating a computerized contest using a central processing machine in communication with a data feed to a source of data concerning temporal sequences, with the participation of users who operate terminals connected to the central processing machine via a network, including the steps of:

communicating to the users a list of participants and a winning formula, sending respective users' choices of a possible outcome to the central processing machine via the users' terminals, and determining an actual outcome according to the winning formula by processing data obtained via the data feed, wherein the data is related to the participants; wherein participants are temporal sequences in a given time period, and wherein the winning formula is a formula applied to participants.

In accordance with an embodiment of the present invention the winning formula incorporates sequence normalization according to: $F(t)=[f(t)-f_0]/f_0$ wherein t is the time index, f(t) is an non-normalized temporal sequence, $f_0$ is the non-zero initial value of f(t), and F(t) is the normalized sequence.

In accordance with another embodiment of the present invention the winning formula incorporates sequence normalization according to: $F(t)=[f(t)-m]/s$ wherein t is the time index, f(t) is an non-normalized temporal sequence, m is the mean value of f(t), s is the standard deviation of f(t), and F(t) is the normalized sequence.

Further in accordance with an embodiment of the present invention the winning formula respectively relates to scores of individual participants (e.g., applicable to races).

Further in accordance with an embodiment of the present invention the winning formula jointly relates to respective temporal events of all participants (e.g., applicable to games).

Still further in accordance with an embodiment of the present invention the sending step takes place prior to the given time period.

Still further in accordance with an embodiment of the present invention the temporal sequences are related to market values associated with a market.

In accordance with an embodiment of the present invention the outcome is an ordered list of sequences according to the respective scores as determined by the winning formula.

Further in accordance with an embodiment of the present invention the outcome is the sequence with the highest score at the evaluation time.

Still further in accordance with an embodiment of the present invention the outcome is an ordered list of sequences according to the respective scores at the evaluation time.

In accordance with an embodiment of the present invention the sequences are organized in pairs, and wherein a pair-rule is further communicated to the users for determining a pair-outcome, and wherein the outcome relates to the collection of the pair-outcomes.

Further in accordance with an embodiment of the present invention the sending step further includes payment by the users, and wherein the determining step further includes payment to users whose respective choices of a possible outcome matches the actual outcome.

DETAILED DESCRIPTION OF EMBODIMENTS

In order to better understand the invention, terms in the art of games will first be defined and discussed. The terms "game" and "contest" are used interchangeably.

A primary game is a contest of a person or persons competing against each other (e.g., baseball teams competing against each other, or tennis players competing against each other) or against some quantity, such as time or distance (e.g., eating the most cake in 10 minutes). A secondary game is a game relating to outcomes of primary games, e.g., a betting game as a secondary game relating to a primary sport contest.

A sport contest is classified according to objectivity or subjectivity of the contest outcome determination. An objective outcome is a measure relating to a contestant's performance independently of the other contestants, e.g., a runner's time or a jumper's distance. A subjective outcome, on the other hand, is a measure relating to joint performance of interacting contestants, typically by counting scoring events, for example, placing a ball in a basket or punching a boxing opponent. While many secondary games, betting included, can be played over a wide-area network like the internet, sporting events (including animal racing) are real-life contests.

In accordance with an embodiment of the present invention, a method and a system are provided for primary contests using mathematical functions as contestants, with clear definitions of objective or subjective outcomes of the contests. For example, a virtual race of mathematical functions may compare the respective extreme values of each function for an objective outcome determination. Subjective outcomes, mimicking sport games, may also count scoring events, whereas such an event is as a combination of subsequent moves made by the contestants. An example for such a combination in a sport event is a "good move" made by one contestant (e.g., hitting a baseball for a possible homerun) and a "bad move" made by the opposing contestant (e.g., failing to catch the ball). Similarly, in a table-tennis game "played" between two temporal functions, a scoring event (a point) may be counted when a value of one contestant exceeds a given threshold ("a good move") immediately followed by the opponent's value dropping below another threshold ("a bad move").

Temporal functions, i.e., functions of time as the independent variable, are of particular interest since future outcomes can be used for entertaining and educational games. Future outcome assessment depends on the contest structure, the nature of the contest functions and the player's skill. Contests can be structured to have different degrees of randomness associated with future outcomes from totally unpredictable outcome to a highly predictable one, at least for an educated player.

Functions may be continuous or discrete, infinite in duration or limited to a time period. They may involve dimensionless numbers or may have respective physical dimensions for dependent and independent variables. In order to simplify formation and operation of such sport-like contests with mathematical functions as virtual contestants, in one embodiment of the invention the mathematical functions are normalized, which respectively transforms contesting functions into dimensionless ones. Normalization can be achieved, for example, by respectively subtracting from each function its mean value and then scaling it by its standard deviations.

Without loss of generality, the invention relates to sequences, e.g., temporal and discrete functions in a given time period. Such sequences may represent daily temperature highs, TV ratings and periodic fluctuations of a financial market, to name a few. Sequences from a public source are observable by the public, for example, sequences related to financial markets.

The following is a more detailed example of carrying out the invention with temporal sequences.

Temporal sequences are defined as one or more sequences occurring in a given period. Examples of temporal sequences include the daily temperatures in Alaska and Hawaii during a given month. Such temporal sequences can be used to form an artificial race where winning may be according to the highest temperature. Although a person skilled in weather can make a reasonable assessment of the odds, the assessment is cumbersome.

The present invention simplifies the race by introducing the concept of an equalizing score, i.e., a formula related to respective temporal sequences, producing respective outcomes which are generally equalized in at least one parameter. For example, such a score may be defined as the extreme temperatures difference divided by the average temperature $[(T_{max}-T_{min})/T_{ave}]$. Another example would be the monthly temperature mean, which is the average of all of the daily highs and lows for one month. The mean-values of the respective scores are thus generally equalized and the winning odds are accordingly equalized.

In order to use the two sequences for creating an artificial game, the concept of an artificial goal is introduced. Unlike the score formula which relates to values of each temporal sequence separately, the goal formula relates to all the temporal sequences "participating" in the game. The formula may assign a goal to a contestant upon the contestant reaching a predetermined "positive" state while the opponents are in a predetermined "negative" state. For example, in the above example of daily temperatures in Alaska and Hawaii (sequences A and B, respectively) during a given month, for illustrative purposes only, assume the following:

Alaska in February: $(T_{max}-T_{min})/T_{ave}=(0° C.-(-40° C.))/-8° C.=-5$

Hawaii in February: $(T_{max}-T_{min})/T_{ave}=(24° C.-0° C.)/16° C.=+1.5$

In a game between sequences A and B, a negative state for B (akin to "A holding the ball" in a conventional game) is when B-score is below a low threshold (e.g., below +1.2). A positive state for A (akin to "A scoring" in a conventional game) is when A-score crosses (upward) a high threshold (e.g., rises above −4). A goal is counted for A when "A holds the ball" and "A scores", that is, when B-score is below +1.2 and A-score is greater than −4.

A contest can include contestants from various fields, e.g., Hawaii temperature and IBM stock.

Contests may be organized as single events, as a "round"—a collections of independent contests, or as a tournament (e.g., league style or cup style).

Temporal sequences may be related to public and non-public sources. A source may be a market with listed items, such as a stock market, commodities market, or other financial markets.

Contests and associated gambling may be carried-out using a communication network (e.g., the Internet), with associated servers, user terminals and data feeds to sources of temporal sequences.

With respect to outcome determination method, objective and subjective contests are equivalent to sport races and games, respectively. The terms races and games represent, therefore, all objective and subjective contests, respectively.

As mentioned, contests-related betting is associated with primary races (e.g., horses, dogs, cars, track-and-field, yachting, etc.) and games (e.g., sport games, computer games). Contest-related betting, unlike lottery-type gambling, favors a skilled player (assuming no one has fixed the contest, of course).

The scope of the present invention includes both combinations and subcombinations of the features described hereinabove as well as modifications and variations thereof which would occur to a person of skill in the art upon reading the foregoing description and which are not in the prior art.

What is claimed is:

1. A method for operating a computerized contest using a central processing machine in communication with a data feed to a source of data concerning temporal sequences, with the participation of users who operate terminals connected to the central processing machine via a network, the method comprising:

communicating to the users a list of participants and a winning formula, sending respective users' choices of a possible outcome to the central processing machine via the users' terminals, and determining an actual outcome according to the winning formula by processing data obtained via the data feed, wherein the data is related to the participants; wherein participants are temporal sequences in a given time period, and wherein the winning formula is a formula applied to participants;

wherein the winning formula comprises sequence normalization according to:

$F(t)=[f(t)-f_0]/f_0$ wherein t is the time index, f(t) is an non-normalized temporal sequence, $f_0$ is the non-zero initial value of f(t), and F(t) is the normalized sequence; or $F(t)=[f(t)-m]/s$ wherein t is the time index, f(t) is an non-normalized temporal sequence, m is the mean value of f(t), s is the standard deviation of f(t), and F(t) is the normalized sequence.

2. The method according to claim 1, wherein the winning formula respectively relates to scores of individual participants.

3. The method according to claim 1, wherein the winning formula jointly relates to respective temporal events of all participants.

4. The method according to claim 1, wherein the temporal sequences are related to market values associated with a market.

5. The method according to claim 1, wherein the outcome is an ordered list of sequences according to the respective scores as determined by the winning formula.

6. The method according to claim 1, wherein the outcome is the sequence with the highest score at the evaluation time.

7. The method according to claim 1, wherein the outcome is an ordered list of sequences according to the respective scores at the evaluation time.

8. The method according to claim 1, wherein the sequences are organized in pairs, and wherein a pair-rule is further communicated to the users for determining a pair-outcome, and wherein the outcome relates to the collection of the pair-outcomes.

* * * * *